United States Patent [19]

Masuda et al.

[11] Patent Number: 4,557,889
[45] Date of Patent: Dec. 10, 1985

[54] METHOD AND APPARATUS FOR PRODUCING SHEET MOLDING COMPOUND PARTS BY COMPRESSION

[75] Inventors: Shigeru Masuda; Tsuneaki Yashima, both of Takasago, Japan

[73] Assignee: Kawasaki Yucoh Co., Ltd., Hyogo, Japan

[21] Appl. No.: 639,184

[22] Filed: Aug. 9, 1984

Related U.S. Application Data

[63] Continuation of Ser. No. 416,556, Sep. 10, 1982, abandoned, and Ser. No. 416,488, Sep. 10, 1982, abandoned.

[30] Foreign Application Priority Data

Sep. 26, 1981 [JP] Japan ................... 56-152649
Sep. 26, 1981 [JP] Japan ................... 56-152648

[51] Int. Cl.[4] .............................. B29D 27/00
[52] U.S. Cl. ................... 264/320; 425/411; 425/DIG. 201
[58] Field of Search .......... 264/255, 294, 320, 338; 425/DIG. 108, DIG. 201, 411

[56] References Cited

U.S. PATENT DOCUMENTS

| | | | |
|---|---|---|---|
| 2,485,452 | 10/1949 | Lyijynen | 425/DIG. 201 |
| 2,921,355 | 1/1960 | Gould et al. | 425/423 |
| 3,568,247 | 3/1971 | Lunn | 425/DIG. 201 |
| 3,776,998 | 12/1973 | Church | 264/294 |
| 3,809,739 | 5/1974 | Gelin | 264/314 |
| 3,898,314 | 8/1975 | Church | 264/318 |
| 4,235,833 | 11/1980 | Arnason et al. | 264/328.12 |
| 4,239,808 | 12/1980 | Arnason | 264/250 |
| 4,332,847 | 6/1982 | Rowland | 264/1.6 |

OTHER PUBLICATIONS

Injection Moulding of Elastomers, W. S. Penn (ed.), Gordon and Breach Science Publishers Inc., 1969, pp. 33-36.

Primary Examiner—Donald Czaja
Assistant Examiner—V. Fischbach
Attorney, Agent, or Firm—Birch, Stewart Kolasch & Birch

[57] ABSTRACT

Coated sheet molding compound (SMC) parts are produced by transferring mold devices between a main press and at least one auxiliary press and by completing the compressing and curing of the coated SMC parts during the transfer of the molds. In the main press the SMC sheet is compressed and cured to be formed into a desired shape, and the formed SMC part is coated in the mold, and in the auxiliary presses the other operation such as charging the SMC sheet, closing and opening the mold, removing the part, and the like are performed. Between the adjacent main press and auxiliary presses are means for transferring the molds between the respective presses. Levelling devices are provided associated with the molds for supporting the upper mold parallel to the lower mold, and during the transfer the coated SMC part is further compressed and cured in the mold by suitably controlling the levelling devices. This method can be sufficiently applied to mass production systems such as automobiles or the like.

9 Claims, 6 Drawing Figures

METHOD AND APPARATUS FOR PRODUCING SHEET MOLDING COMPOUND PARTS BY COMPRESSION

This is a continuation of application Ser. Nos. 416,556 now abandoned and 416,448 now abandoned, both filed on Sept. 10, 1982.

BACKGROUND OF THE INVENTION

The invention relates to a method and apparatus for producing sheet molding compound (SMC) parts, such as parts of automobiles or the like, by compression, and more particularly it relates to a method for producing SMC parts by compressing and coating in the mold to improve the productivity.

SMC sheets, which are composite material of reinforced thermosetting plastics, such as unsaturated polyester resins with fiber glass, have been recently used as parts of automobiles or the like instead of metal sheets. Heretofore, the SMC parts have been produced by conventional hydraulic press systems according to a typical operational stroke and time diagram as shown in FIG. 1. This process consists of charging a SMC sheet into a mold at A, closing the mold at B, gelling the SMC sheet, flowing and filling the SMC into the mold cavity at C, compressing and curing the SMC at D, opening the mold at E, and removing the formed SMC part at F. When the SMC parts are applied as parts of automobiles or the like, they serve to shorten the assembling process and lighten the weight, but they increase the cycle of time producing parts. Various research has been conducted to shorten the cycle time, but the special property of the SMC materials, such as curing, makes it difficult to shorten the cycle time to any great extent.

Furthermore, on most of the surfaces of the SMC parts produced by compressing there are formed small pinholes and sink marks or the like, and exterior parts, such as exterior body panels of automobiles, must be coated to improve their surface quality. When the SMC parts are coated during the forming process, their surface pit defects, such as pinholes and sink marks, can be removed and pit finding and pit fitting in the following process are eliminated to reduce the coating cost, but the cycle time is still further increased by coating, compressing and curing the coating parts.

The above cycle of the operational stroke and time diagram has been studied for the purpose of overcoming these shortcomings, and as a result, it has been found that the compressing and curing times make up more than one half of the cycle time, and the remainder of the time is consumed by the pressless steps of the operation, such as charging the SMC material, closing and opening the mold, and the like. Consequently, the resulting forming efficiency is not very high. In addition, during compressing and curing of the SMC sheets a predetermined large press force and corresponding power is required, whereas during the steps of the process other than the compression phase, the operation can be sufficiently performed by using a much smaller power requirement than that necessary during the compression phase. Furthermore, as shown in FIG. 1, in the former the operation can be performed within an extremely short stroke, but in the latter the operation requires a longer stroke. Thus, it is clearly understood that conventional SMC compression systems are uneconomically constructed and function at a low production rate.

As the SMC material is charged to a suitably heated mold, it is softened and fluidized, and upon heating becomes gelled. By applying a small amount of force, it can be easily made to flow and fill the mold cavity. As it is further heated, the material starts to cure and expand, and the compression power is gradually increased so as to suppress the expansion. As curing further proceeds, the material starts to contract, and a predetermined large force is applied and kept on the mold until the end of the curing. In this manner, the SMC parts are produced, but the long curing time requires the long cycle time as above mentioned. Furthermore, coating of the formed SMC part during the forming process further increases the cycle time.

Accordingly, if the compressing and curing operation and the other pressureless steps are separated, and the two phases of the operations are performed at the same time, the production rate can be doubled. However, as the SMC chemical reactions are continuously proceeding, the respective operations should be continuously performed, such as during the transferring of the mold, to form the SMC sheet into the desired shaped part.

SUMMARY OF THE INVENTION

Therefore, it is an object of this invention to provide a novel and useful method and apparatus for producing coated SMC parts productively and economically by compression.

Another object of the present invention is to provide a method for producing coated SMC parts by compression, while improving the productivity and reducing the cycle time of the overall process to approximately one half of the conventional time, even though the SMC parts are coated during the forming process.

Another object of this invention is to provide a method and apparatus for producing SMC parts by compression, which will improve the productivity and reduce the cycle time to approximately one half of that of the conventional time required, by effectively separating the steps of the overall operation into a first compressing and curing phase and a second phase including the pressureless steps as discussed above, and performing each phase respectively at the same time, and precisely produce the SMC parts utilizing controlling levelling devices and continuously flowing and filling the SMC sheet material into the mold cavity while transferring the mold between each of the phases of the operation.

A further object of the present invention is to provide a method for economically producing coated SMC parts without raising the cost in proportion to the productivity, by producing the SMC parts at a high production rate as much as twice the rate of conventional productivity.

In accordance with the present invention, coated SMC parts can be economically molded by effectively separating the steps of the operation into a compressing and curing phase which takes place in a high compression press means and a phase which includes the remaining substantially pressureless steps including the charging of the SMC, opening and closing the mold, filling the mold cavity, and removing the cured product, which takes place in at least one auxiliary press, and connecting both phases by transferring the molds between each phase, the flowing and filling of the SMC sheet material into the mold cavity being suitably controlled by levelling devices associated with the molding equipment.

Other objects and advantages of this invention will become apparent from the following description.

DETAILED DESCRIPTION

Figure 1:
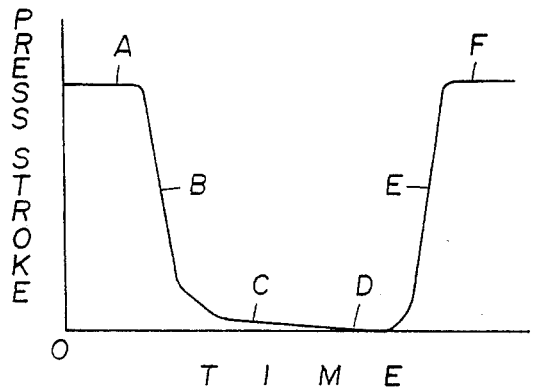
FIG. 1 represents a conventional cyclic stroke and time diagram of forming SMC parts.
Figure 2:
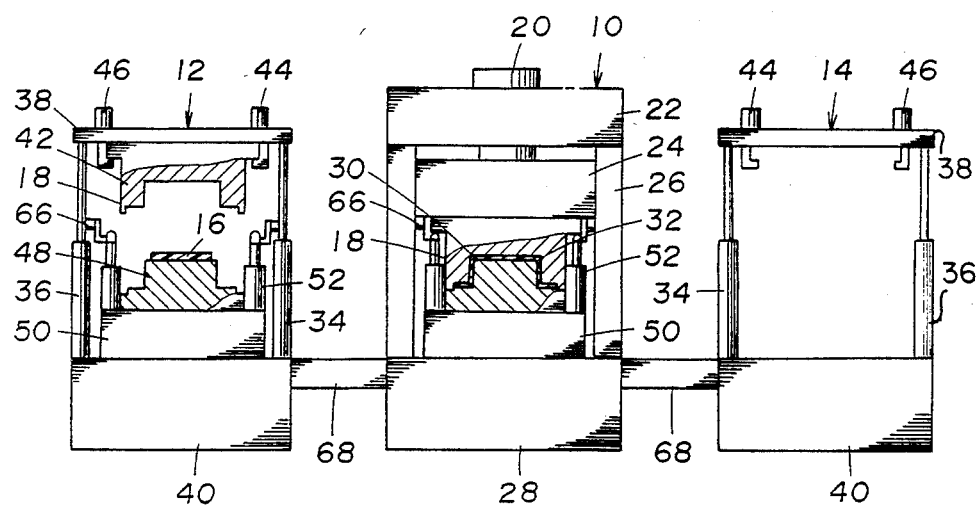
FIG. 2 is a schematic, fragmentary sectional side view of an embodiment of an apparatus for carrying out the present invention.
Figure 3:
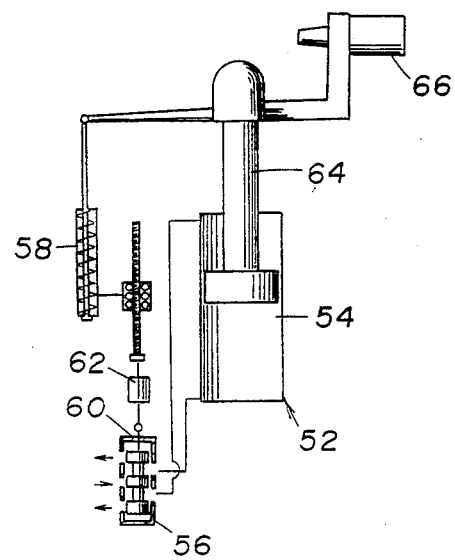
FIG. 3 is a schematic fragmentary sectional view of a levelling device of the apparatus in FIG. 2.

Referring to FIG. 2 there is seen an exemplary illustration of a preferred embodiment of the invention, which comprises a main press 10, and two auxiliary presses 12 and 14. The main press 10 is compactly constructed having a short stroke and providing the necessary power to deliver the required force for compressing and curing a SMC sheet 16 in a mold device 18. The main press is capable of developing the necessary force adapted to the short stroke hydraulic cylinder 20 supported by the upper frame 22 and upright members 26 and is provided with a stiff moving platen 24. The platen 24 is arranged to be slidably moved in the vertical direction toward the lower frame 28 by the cylinder 20 according to a servo control system (not shown) or the like. At the lower surface of the platen 24 a suitable conventional injector will be mounted. The inlet of the injector is connected by a flexible hose to a coating source for supplying coating materials, such as a single compound liquid coating or a two compound liquid coating as disclosed in U.S. application Ser. Nos. 814,502 or 852,625 (Japanese Application No. 53-65862 or 53-142136, Japanese Laid - Open Application No. 54-36369 or 54-81398). The outlet of the injector hose is removably connected to a sprue mounted in the upper surface of the mold 18 so as to enable the coating materials to be coated over the compressed SMC part 30 in the mold 18. Between the platen 24 and the lower frame 28 is placed the mold 18 compressing the upper mold half 42 and the lower mold half 48 which upon closing the upper half is lowered to a predetermined height in the auxiliary presses 12 and/or 14. The hold is herein represented in an open condition in the auxiliary press 12. In the mold 18 of press 10 the SMC sheet 16 is compressed into the mold cavity 32 to be formed into a desired shape and coated in the mold 18, as above described. The auxiliary presses 12 and 14 are symmetrically constructed juxtapositioned with respect to the main press 10. They are of simple construction having a predetermined low power requirement and long stroke, and used for the substantially pressureless steps, such as charging the SMC sheet 16, closing and opening the mold 18 and removing the SMC part 30, and the like. On the lower frame member 40, there are respectively provided a plurality of predetermined low power and long stroke lift cylinders 34 and 36 for moving the upper frame member 38. The upper mold half 42 is demountably secured to the beamed shaped upper frame member 38 by clamping devices 44 and 46 and is suitably moved vertically by the lift cylinders 34 and 36. The lower mold half 48 is securely mounted to a bolster 50 and arranged so as to be placed at a specified position on the lower frame member 40 or the lower frame 28. The bolster 50 is respectively arranged so as to reciprocably traverse between the main press 10 and auxiliary presses 12 and 14 by transfer devices (not shown), such as hydraulic cylinders or the like, and the mold 18, coupled by closing the upper mold 42 onto the lower mold 48, is suitably carried between the presses. At the four corners of the bolster 50 levelling devices 52, such as servo mechanical actuators, are respectively vertically located so that they support the upper mold 42 parallel to the lower mold 48 in the closed position and are transferred with the bolster 50 while supporting the upper mold 42 parallel to the lower mold 48. Each of the levelling devices 52, as shown in FIG. 3, comprises a predetermined power hydraulic actuator 54, a control unit 56 and a positioning rod 58 for operating the actuator 54 to the required position. In operation, a servo valve 60 operated by the pulse motor 62 of the control unit 56 actuates the vertically fixed hydraulic actuator 54, with the movement of the rod 64 being translated to the servo valve 60 through the positioning rod 58, and the rod 64 is moved to a position determined by the instructions of the pulse motor 62, respectively. Thus, each rod 64 of the hydraulic actuator 54 suitably controls the speed and precise parallel movements required according to the input pulse numbers from a control box (not shown). As shown in FIG. 3, the levelling device 52 is respectively equipped with a locking device 66 such as a locking cylinder or the like at the upper portion of the cylinder rod 64. The upper mold 42 is removably clamped onto the levelling devices 52 such that the coated SMC part 30 is cured by a required force. In this manner, the upper mold 42 removably supported by the levelling devices 52 in contact with SMC material, is vertically moved with a high degree of accuracy both as to positioning and speed according to a predetermined program control. Description with respect to various structures, such as temperature control means of the moving platen, guiding members, elements of the coating means and the like are omitted, but they may be constructed of any suitable means well known to those skilled in the art. Elements 68 show transfer rails for transfer devices.

The operation is further described as follows with reference to FIG. 4–FIG. 6.

Figure 4:
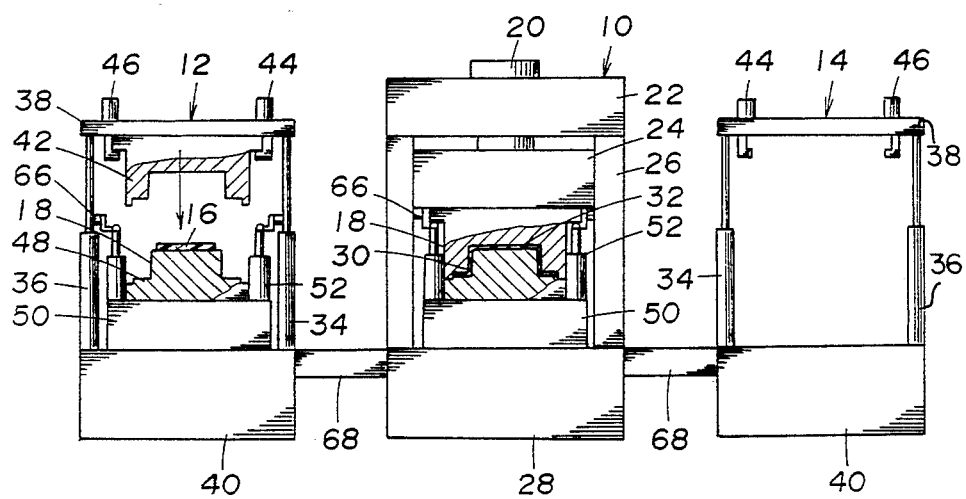
FIG. 4–FIG. 6 are respectively schematic fragmentary sectional side views of each step of forming SMC parts by the apparatus in FIG. 2.

Initially, as shown in FIG. 4 a suitable size SMC sheet 16 is charged onto the lower mold 48 in the auxiliary press 12, in which the upper mold 42 has been raised to a predetermined height by the lift cylinders 34 and 36. Then, the upper mold 42 is lowered against the lower mold 48 by simultaneously activating the lift cylinders 34 and 36. At a predetermined height the upper mold 42 is removed from the upper frame member by unclamping the clamping devices 44 and 46, and smoothly placed on the levelling devices 52. The hydraulic actuators 54 of the levelling devices 52 are actuated and lower the upper mold 42 at a uniform speed so as to lightly press the SMC sheet 16, as shown in FIG. 5, by controlling the pressure and position according to the programmed commands. The upper mold 42 is uniformly closed parallel to the lower mold 48. As the upper mold 42 and the lower mold 48 are suitably heated, the SMC sheet 16 is softened and fluidizes to flow and fill the mold cavity 32 in response to the loads as small as the weight of the upper mold 42. Therefore, the auxiliary presses 12 and 14 require only small power and simple structure to preform the SMC sheet material. The flowing and filling, timing and rate and the like are controlled through the levelling devices 52 by the programmed commands from the control box. As the upper mold 42 is controlled by the levelling devices 52, the SMC sheet 16 precisely and uniformly flows and fills the mold cavity 32.

Figure 5:
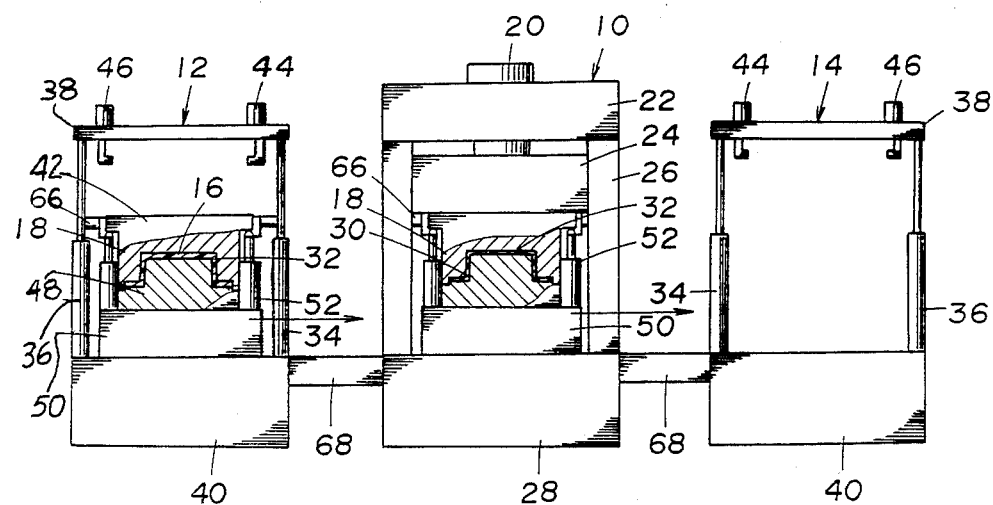

Simultaneously, in the main press 10, the SMC sheet 16 in the mold 18, which has been closed in the other auxiliary press 14 as above mentioned, and transferred to the main press 10, is compressed and cured by the large press power hydraulic cylinder 20 to be formed into a desired shape, as shown in FIG. 5. After the SMC sheet 16 is compressed and cured, the main cylinder 20 is raised and the upper mold 42 is slightly opened, for instance 1-6 mm, by raising the levelling devices 52 parallel to the lower mold 48. At the same time, the mold 42 is locked to the levelling devices 52 by the locking devices 66. If necessary, the upper mold 42 may be locked to them beforehand. Then, a injector mounted in the platen 24 is operated and the coating materials are injected from the injector over the SMC part 30 through the sprue connected to the injector. As the upper mold 42 is kept parallel to the lower mold 48 with the desired gap by controlling the levelling devices 52, the coating materials are evenly supplied over the SMC part 30 to a uniform thickness. After coating, the platen 24 is raised to a determined height and the upper mold 42 is lowered so as to close the mold 18 by lowering the levelling devices 52. The compressing and curing of the SMC sheet 16, and coating the formed SMC part 30 in the mold 18, can be sufficiently performed by the predetermined high power press 10 and short stroke hydraulic cylinder 20, without the long stroke and large press power cylinder such as with conventional systems. Consequently, the large size and stiff structures as before used are not required, and the SMC part can be compactly constructed as shown in the figures.

Figure 6:
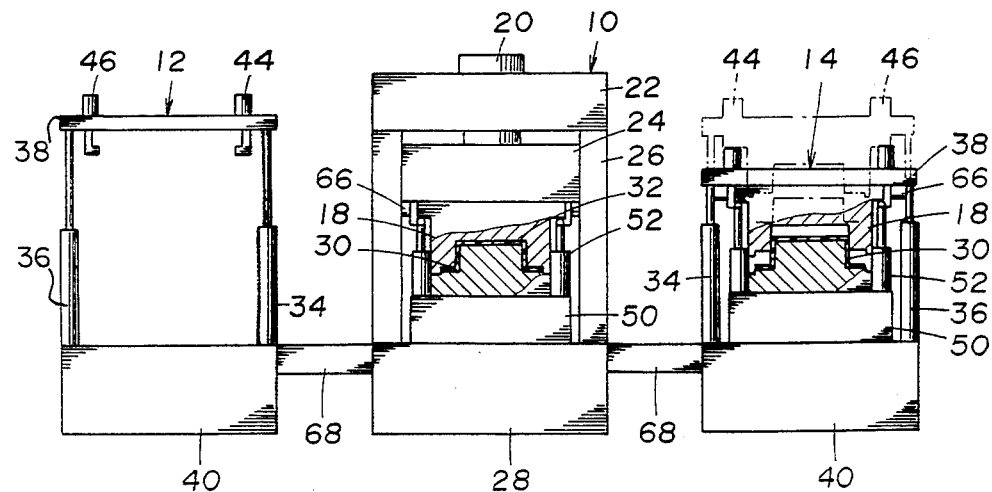

Then, as shown in FIG. 6, the mold 18 is transferred to the auxiliary press 14 by the transfer device over the transfer rails 68. During the transfer, the upper mold 42 locked to the levelling devices 52 is maintained parallel to the lower mold 48 by controlling and levelling devices 52 according to the programmed speed and pressure controls, and the coated SMC part 30 is continuously compressed and cured by the predetermined force. As the force necessary for the continuous compressing and curing of the coated SMC part 30 is approximately from one-tenth to one-fifth of the SMC compressing force in the main press 10, the coating operation is sufficiently completed during transfer regulated by the levelling devices 52 without further operation of the main equipment 10. Therefore, the operation can be continued during the transfer of the mold 18, and the cycle time is only slightly lengthened by the coating of the SMC part 30. On the other hand, the other mold 18, which has been closed as above mentioned, in the other auxiliary press 12 (FIG. 5), is simultaneously carried into the predetermined position in the main press 10 by another transfer device. During transferring the mold 18, the upper mold 42 is kept closed on the lower mold 48 and maintained parallel by controlling the levelling devices 52 in succession to the preceding operation as above mentioned, and the SMC sheet 16 continuously flows and fills the mold cavity 32, as it is carried to the main press 10. All of the operations are continously connected as the SMC chemical reaction proceed, and the SMC sheet 16 easily flows and fills all of the corners of the mold cavity 32, though the compressing and curing phase and the pressless phase are separated and respectively performed. In the main press 10, as shown in FIG. 6, the SMC sheet 16 is compressed and cured as above mentioned. On the other hand, in the auxiliary press 14 the levelling devices 52 raise the upper mold 42, the lift cylinders 34 and 36 are lowered, and the clamping devices 44 and 46 clamp the upper mold 42 to fix beneath the upper frame 38 and raise the upper mold 42 to a predetermined height. Then, the SMC part 30 is removed, by a discharge device (not shown), from the mold 18 and next SMC sheet 16 is charged onto the lower mold 48, as above mentioned.

In this manner, by being interchangeably transferred between the main press 10 and the auxiliary presses 12 and 14, and by continously flowing and filling the mold cavity 32 during the transfer of the mold 18, the SMC sheets 16 are formed into the desired configurations and coated in turn.

Therefore, inasmuch as the compressing and curing operation in the main press and the remaining pressless steps in the auxiliary presses can be performed at the same time, the forming cycle time can be reduced to approximately one half that of the conventional time, depending upon the materials, forming dimensions and the like. As the SMC sheet material continuously flows and fills the mold cavity at a uniform speed regulated by the levelling devices which maintain the upper mold parallel to the lower mold during the transfer, the SMC part is continuously being formed from the charging to the compressing and curing, to discharge of the part, thereby producing the SMC part at a uniform thickness and strength.

Conventional SMC compressing systems are uneconomically constructed of a predetermined large power and long stroke press. The system of the present invention is designed to be compact and simply constructed, as above described, and can be economically constructed without raising the cost in proportion to the productivity, even though the productivity can be approximately doubled. In addition, the small volume required by the main press cylinder causes the compressibility of the hydraulic oil to be less and improves the positioning accuracy, pressure controlling accuracy and the product quality.

In the above embodiment, the levelling devices are not limited to the servo hydraulic cylinder system, and may be used as high accuracy systems such as electro motor actuator systems or the like.

Furthermore, in the above embodiment the injector is equipped in the moving platen of the main press, however, to be commonly used with the molds, it may be respectively mounted in each of the molds to coat the SMC parts. As a result, of the above mentioned in—mold coating, the SMC parts may be coated partially or wholly during the transfer of the molds.

Furthermore, in the above embodiments, the molds are carried simultaneously between the main press and auxiliary press, but they may also be carried separately as described. They may be designed to be carried by using well known quick die changers or the like. Furthermore, in a plant where a plurality of the main presses and auxiliary presses are arranged, a mold handling system may be provided to deliver the molds to the presses according to a computer control system. In addition, the above systems may be designed to produce a plurality of the SMC parts at once.

While the invention has been described in terms of the embodiments herein illustrated, it is not intended that the invention be limited to the details shown since various modifications and structural changes may be made without departing in any way from the spirit and scope of the present invention. Such modifications as would be obvious to one skilled in the art are intended to be included within the scope of the following claims.

What is claimed is:

1. A method for producing a sheet molding compound part from a sheet molding compound material which comprises:

providing a main high compression press means including a movable platen capable of developing a force required for compressing into a predetermined shape and curing said sheet molding compound material by delivering a short, high compression stroke to said sheet molding compound material;

providing at least one auxiliary low compression press means including a mold form for molding said sheet molding compound material comprising an upper mold half and a lower mold half, said at least one auxiliary low compression press means being interconnected with and juxtapositioned to said main press means;

providing vertically aligned adjustable precision levelling devices for continuously maintaining said upper mold half parallel with said lower mold half throughout said molding operation;

charging said sheet molding compound material to said lower mold half of said mold form in said at least one auxiliary press means;

closing said mold form by lowering said upper mold half to said lower mold half to form a mold cavity so as to initially shape said sheet molding compound material such that said material flows and fills said mold cavity, said upper mold half being supported by said levelling devices;

transferring said mold form containing said sheet molding compound material to said main high compression press means by way of said interconnection together with said levelling devices, said levelling devices continuously maintaining said upper mold half parallel with said lower mold half, while substantially simultaneously heating said mold during said transfer process thereby softening and fluidizing said sheet molding compound material such that said material continues to flow and fill said mold cavity, said levelling devices being synchronously adapted to control said flowing and filling of said mold in response to precise positioning by a predetermined programmed control according to a gelled state of said sheet molding material such that said sheet molding material evenly and uniformly fills said mold cavity;

compressing and curing said sheet molding compound material into said predetermined shape within said high compression press means;

transferring said mold from said main press means to said at least one auxiliary press means together with said levelling devices, and removing said sheet molded compound part.

2. The method of claim 1, wherein there is provided at least two auxiliary low compression press means, each with a respective mold form, such that said mold forms are transferable between said main press and said respective auxiliary presses.

3. The method of claim 2, wherein that phase of the operation which takes place in the respective at least one auxiliary low compression press means can be carried out substantially simultaneously with that phase of the operation which is carried out in the main high compression press means.

4. The method of claim 1, wherein heat is continuously applied to said mold during the method of producing said sheet molding compound parts.

5. The method of claim 1, wherein said platen includes a means for coating said shaped sheet molding compound material while in said main press means with a coating material.

6. An apparatus for producing sheet molding compound parts from sheet molding compound materials which comprises in combination:

a high compression press means including a movable platen capable of developing by way of a short stroke a force required for compressing into a predetermined shape and curing said sheet molding material;

at least one auxiliary low compression press means including a mold form comprising an upper half and a lower half for shaping said sheet molding material and means for opening and closing said upper half and lower half, said auxiliary low compression press means being juxtapositioned with respect to said main press means;

adjustable vertically aligned precision levelling devices for continuously maintaining said upper mold half parallel with said lower mold half; and intermediate means for joining said high compression press means with said at least one auxiliary press means and for transferring said mold form between said at least one auxiliary press means and said high compression press means.

7. The apparatus of claim 6, comprising at least two auxiliary press means juxtapositioned to said high compression press means, each of which is provided with respective mold forms, said mold forms being transferably between said high compression press means and said respective auxiliary press means.

8. The apparatus of claim 6, comprising a plurality of auxiliary low compression press means juxtapositioned to an interconnected with said high compression press means.

9. The apparatus of claim 6, wherein said movable platen of said high compression press means includes a means for coating said shaped sheet molding material.

* * * * *